United States Patent
Gonzalez et al.

(10) Patent No.: US 7,672,247 B2
(45) Date of Patent: Mar. 2, 2010

(54) EVALUATING DATA PROCESSING SYSTEM HEALTH USING AN I/O DEVICE

(75) Inventors: Ron Encarnacion Gonzalez, Austin, TX (US); Binh K. Hua, Austin, TX (US); Sivarama K. Kodukula, Round Rock, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 11/363,291

(22) Filed: Feb. 23, 2006

(65) Prior Publication Data

US 2007/0195704 A1    Aug. 23, 2007

(51) Int. Cl.
  *G01R 31/08* (2006.01)
  *G01B 5/14* (2006.01)
(52) U.S. Cl. ............... 370/252; 370/245; 702/188; 714/47; 709/224
(58) Field of Classification Search ........... 370/229, 370/239, 240, 241, 242, 244, 245, 250, 216; 702/127, 188, 182–185; 710/1, 36, 48, 15; 714/100, 1, 25, 47, 2, 15, 20, 48, 55, 3, 4; 700/100, 1, 2, 3, 4, 25; 709/203, 232, 243, 709/230
See application file for complete search history.

(56) References Cited

U.S. PATENT DOCUMENTS

| 6,073,182 A | 6/2000 | Jones et al. |
| 6,085,277 A | 7/2000 | Nordstrom et al. |
| 6,683,850 B1 | 1/2004 | Dunning et al. |
| 6,687,847 B1 * | 2/2004 | Aguilera et al. ............. 714/4 |
| 6,792,483 B2 * | 9/2004 | Schmidt ..................... 710/48 |
| 7,493,512 B2 * | 2/2009 | Apelbaum et al. .......... 714/2 |
| 7,502,328 B2 * | 3/2009 | Lee et al. .................... 370/242 |
| 2003/0035408 A1 | 2/2003 | Hebert |
| 2004/0003078 A1 * | 1/2004 | Todd et al. ................. 709/224 |
| 2004/0003317 A1 * | 1/2004 | Kwatra et al. .............. 714/25 |
| 2005/0021311 A1 * | 1/2005 | Deb et al. ................... 702/188 |
| 2005/0243729 A1 * | 11/2005 | Jorgenson et al. ......... 370/241 |
| 2006/0010352 A1 * | 1/2006 | Mukherjee et al. ......... 714/47 |
| 2006/0010357 A1 * | 1/2006 | D'Alo et al. ............... 714/100 |

FOREIGN PATENT DOCUMENTS

JP          55163834          5/1982

* cited by examiner

*Primary Examiner*—Ricky Ngo
*Assistant Examiner*—Paul Masur
(74) *Attorney, Agent, or Firm*—Yee & Associates, P.C.; Libby Z. Handelsman

(57) ABSTRACT

A computer implemented method, apparatus, and computer usable program code for monitoring health of a data processing system. A determination is made whether a response is received within a first time period in response to an I/O device sending a receive descriptor to the data processing system. A determination is made whether a second time period passes before the receive descriptor becomes available for sending to the data processing system in response to an unavailability of the receive descriptor for sending by the I/O device to the data processing system. A health check is performed on the data processing system if the first time period passes without receiving a response. A health check is performed on the data processing system if the second time period passes without a receive descriptor becoming available to send the data processing system.

19 Claims, 4 Drawing Sheets

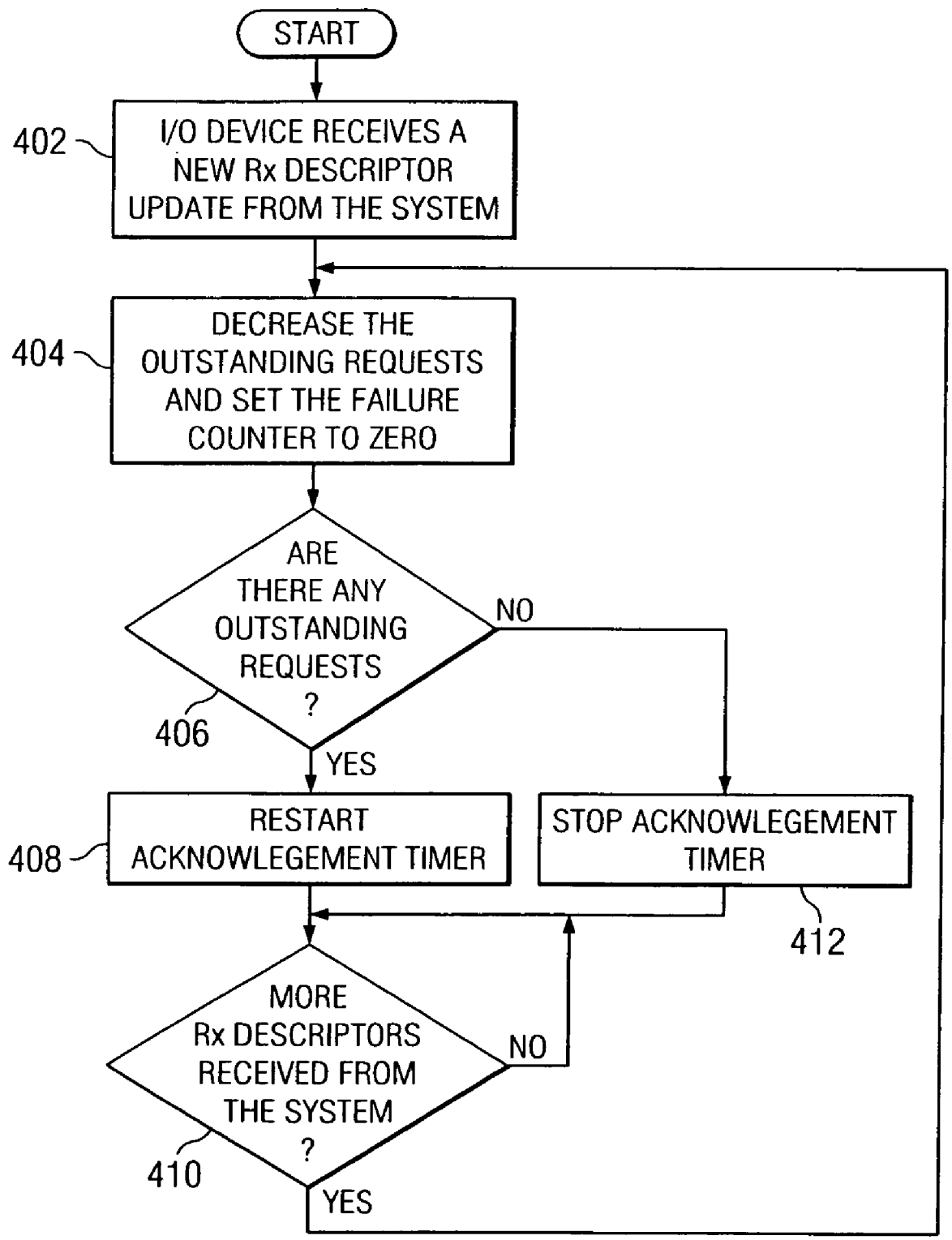

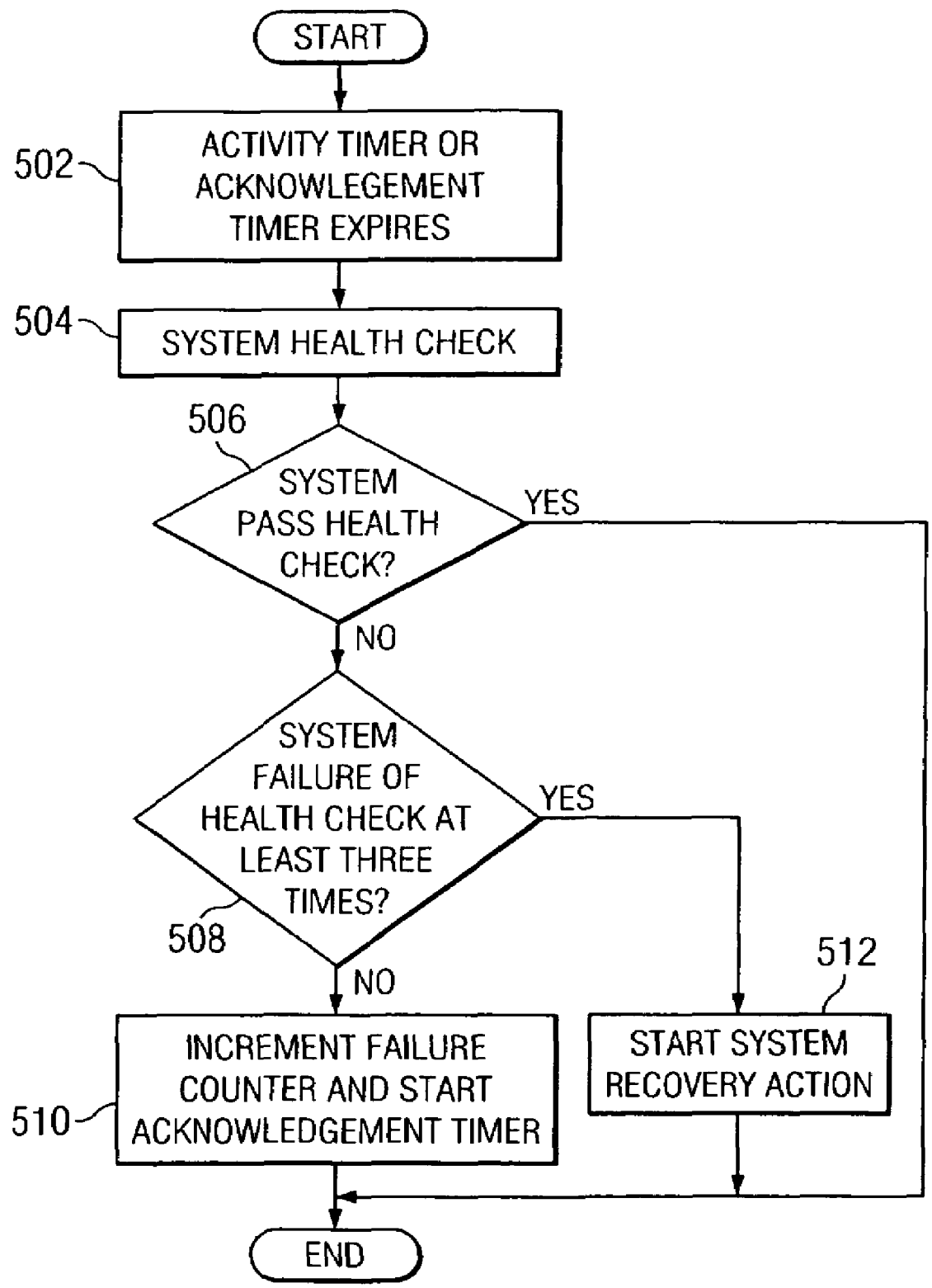

EVALUATING DATA PROCESSING SYSTEM HEALTH USING AN I/O DEVICE

BACKGROUND OF THE INVENTION

1. Field of the Invention

The present invention relates generally to data processing, and in particular to a computer implemented method, apparatus, and computer usable program code for evaluating system health using an I/O device.

2. Description of the Related Art

Reliance on data processing systems has grown exponentially in recent years because of the increased use of computing devices in every aspect of business and society. Because of their importance, data processing systems are expected to be operational all the time. However, in the real-world, data processing systems frequently experience failures due to hardware or software errors. In some cases, these failures cause the system to hang or otherwise fail.

System down-time is especially damaging to many real time applications that rely on the data processing system, such as a dedicated server that performs business transactions through the Internet. When a system hangs or fails, the condition of the system needs to be detected as soon as possible so the system may be recovered or a back-up activated. A system that hangs may be especially hard to detect because the whole system stops and no processes are running to detect the problem.

Some current systems use a heart beat mechanism to detect the health of a monitored system via a network connection. System recovery actions are undertaken when the heart beat stops. The user of a heart beat has some limitations. For example, the heart beat may stop both because of a system hang and because of a network malfunction. Additionally, if the failure is part of the monitoring network, both a primary and standby server may be active simultaneously. As a result, data integrity problems may occur if both systems are, for example, responding to client requests. In some cases, the heart beat monitoring mechanism may take a long time to detect a system hang or failure.

SUMMARY OF THE INVENTION

The aspects of the present invention provide a computer implemented method, apparatus, and computer usable program code for monitoring health of a data processing system. A determination is made whether a response is received within a first selected period of time in response to an I/O device sending a receive descriptor to the data processing system. A determination is made whether a second selected period of time passes before the receive descriptor becomes available for sending to the data processing system in response to an unavailability of the receive descriptor for sending by the I/O device to the data processing system. A health check is performed on the data processing system if the first selected period of time passes without receiving a response. A health check is performed on the data processing system if the second selected period of time passes without a receive descriptor becoming available to send the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart illustrating acknowledgement timer operation in accordance with an illustrative embodiment of the present invention; and FIG. 5 is a flowchart illustrating a system health status check in accordance with an illustrative embodiment of the present invention.

DETAILED DESCRIPTION OF THE PREFERRED EMBODIMENT

Figure 1:
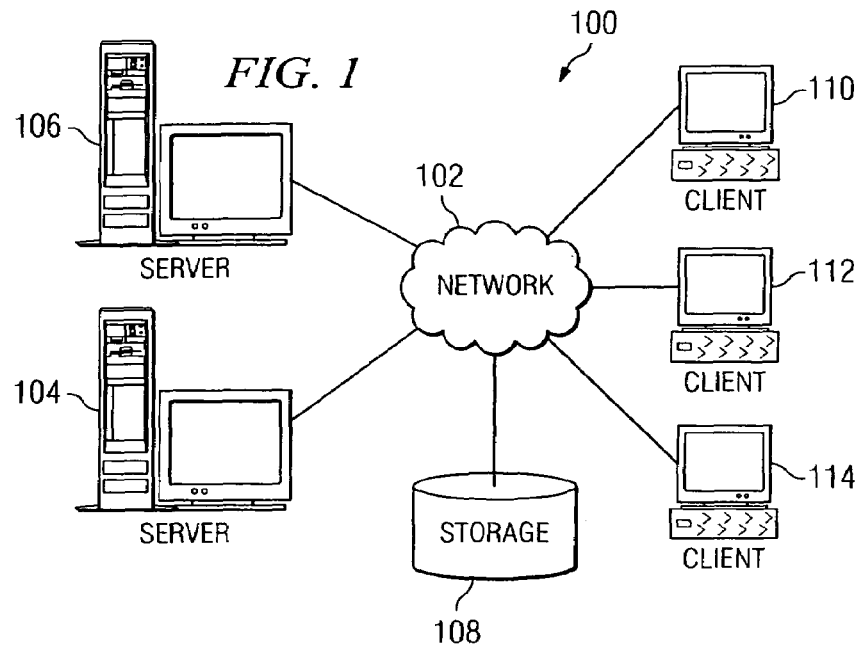
FIG. 1 is a pictorial representation of a data processing system in which the aspects of the present invention may be implemented.
Figure 2:
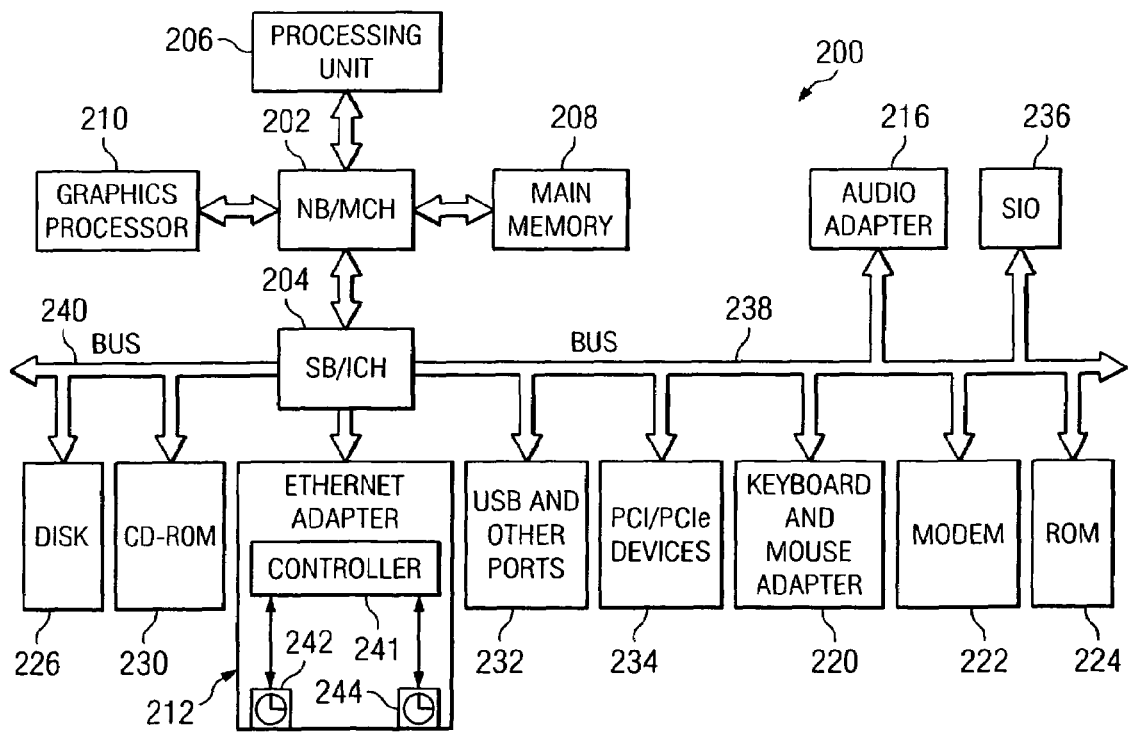
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network Ethernet adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, network adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or Ethernet adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a computer implemented method, apparatus, and computer usable program code of using an I/O adapter or device to detect a system failure. System failure refers to a system hang, crash, failure, or a state or condition in which the system is otherwise unresponsive. The I/O adapter may be any number of input or output devices such as Ethernet adapter 212, a Fibre channel, or any other I/O device. I/O adapters provide an efficient way of monitoring the health of data processing system 200 because of the frequent communications and interaction of the I/O adapter with the operating system and processing unit 206 of data processing system 200.

In one illustrative embodiment, the I/O adapter used to monitor system health is Ethernet adapter 212. Ethernet adapter 212 may include controller 241 and additional hardware timers. Ethernet adapter 212 may use controller 241 for communication and to monitor various devices which may include data processing system 200, acknowledgement timer 242, and activity timer 244 among many elements. Controller 241 is operably connected to acknowledgement timer 242 and activity timer 244. In one example, controller 241 may be part of the I/O adapter's direct memory access (DMA) design logic. The controller 241 may implement various processes that operate continuously to monitor system health once Ethernet adapter 212 is initialized.

Controller 241 sends control signals to the timers including commands to start, stop, and reset. Controller 241 also receives signals from acknowledgement timer 242 and activity timer 244 indicating a specified time period has elapsed.

Acknowledgement timer 242 is located in Ethernet adapter 212 and monitors the health of data processing system 200 by checking the system responses for activity received by Ethernet adapter 212. For example, if Ethernet adapter 212 has not received any indications or a confirmation that received packets are processed by the device driver of data processing system 200 within a specified time period, acknowledgement timer 242 tells Ethernet adapter 212 of the time lapse and Ethernet adapter 212 starts a system health status check. The device driver is a program designed to interface Ethernet adapter 212 with the operating system of data processing system 200.

The system health status check may vary depending on the operating system used by data processing system 200. For example, during the system health status check, Ethernet adapter 212 may evaluate usage of processing unit 206 or main memory 208 to determine if data processing system 200 is functioning normally.

In another example, Ethernet adapter 212 may write a flag to a specific memory location in which the flag initiates a system health check. In other examples, Ethernet adapter 212 may initiate diagnostic or instruct data processing system 200 to initiate a run time diagnostic.

If the system fails to pass the health status check, the system is deemed to have failed and a system recovery action is initiated. The system recovery action may vary between different systems which may involve, for example, rebooting the system, entering a limited operation mode, or initiating fail-over activation of a stand-by system or other appropriate failure responses.

For example, if the failing system is a logical system on a physical system, the I/O adapter may generate an interrupt to the physical system firmware to start the system recovery action. In one illustrative embodiment, the logical system is a logical partition operating as an independent system that may have failed and may require a recovery action be taken. Alternatively, in a single physical system, the I/O adapter may wake up the stand-by system by using a wake-on-local area network mechanism. Wake-on-local area network is a technology used to remotely wake up a sleeping or powered off data processing system over a network. When the system is turned off, the managed network adapter uses an alternate power source to monitor the network and watch for a wake-up packet originating from Ethernet adapter 212. Once it receives a packet, it alerts the system to power up and accept any stand-by task it is given.

The acknowledgement time period timed by acknowledgement timer 242 may be user specified or automatically determined based on the interface between the device driver and Ethernet adapter 212. The acknowledgement time period may be set based on the load of the system and system I/O subsystem. The acknowledgement time period may increase or decrease dynamically. For example, acknowledgement timer 242 may adjust to a longer time period when the acknowledgement timer 242 timeouts, but the system health is still good. In another example, the acknowledgement time period may be decreased if the system is experiencing difficulties, but has not yet failed.

Acknowledgement timer 242 may be part of any number of I/O adapters. Acknowledgement timer 242 measures the amount of time for a specified I/O adapter and device driver to communicate. Communication refers to sending, receiving, or the confirmation of data received. The time between these types of communication between the I/O adapter and device driver is used by acknowledgement timer 242 to ensure that the system is functionally normally or in a healthy manner. The type of communication may vary among I/O devices. For Ethernet adapter 212, the communication may be based on descriptors or packets sent and received. In other devices, the timed communications may be input or output between the I/O device and device driver. For example, every time the I/O device may require confirmation that an input is received by the device driver. Once an input is sent by the I/O adapter to the device driver, acknowledgement timer 242 may be started. If confirmation from the device driver is received, the acknowledgement timer 242 may be reset until the next communication is initiated.

Ethernet adapter 212 may also include activity timer 244. Activity timer 244 is used to force the I/O adapter to check the health of a system when there are no ongoing communications between the I/O adapter and the device driver. The activity time period measured by activity timer 244 may be user specified or automatically selected. The acknowledgement timer period and activity timer period may be the same or different amounts of time. For example, if the I/O adapter is Ethernet adapter 212 and there is no transmission of received packets or other communications between Ethernet adapter 212 and device driver, activity timer 244 may force Ethernet adapter 212 to perform a system health status check. If data processing system 200 fails the system health status check, Ethernet adapter 212 initiates the specified system recovery action.

Figure 3:
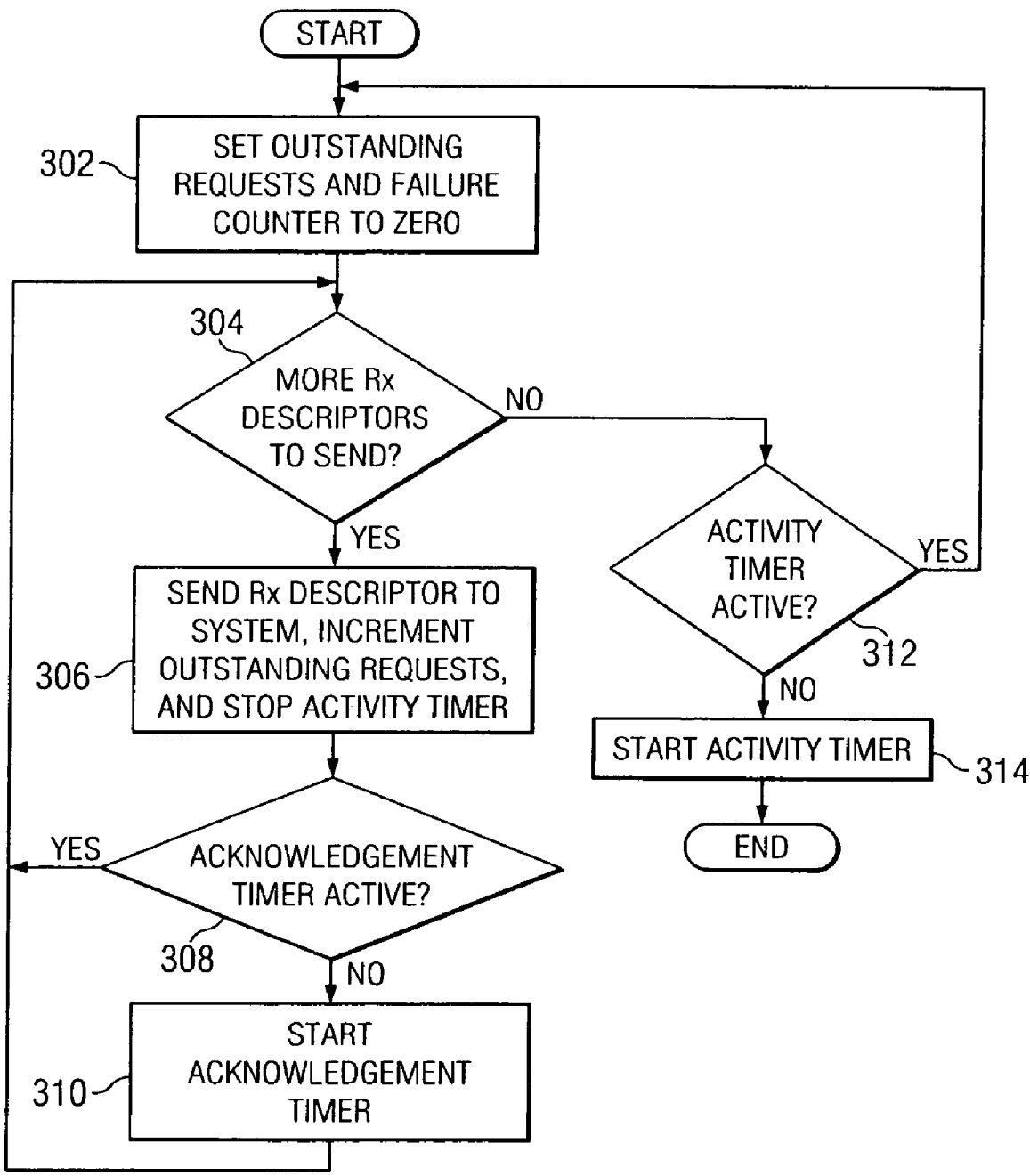
FIG. 3 is a flowchart illustrating activity timer operation in accordance with an illustrative embodiment of the present invention.

The processes of FIGS. 3-5 run concurrently to monitor the health of a system. The processes may be implemented between a system, I/O device, and timers such as data processing system 200, Ethernet adapter 212, acknowledgement timer 242, and activity timer 244 of FIG. 1. The process illustrated in FIGS. 3-5 may be implemented in a I/O adapter controller, such as controller 241 of FIG. 2. The process and steps may be implemented by a physical circuit, state machine, or computer usable program instructions. As soon as the I/O adapter is initialized by the applicable device driver or system firmware, the processes of FIGS. 3-5 begin to run. The processes of FIGS. 3 and 4 may never stop while the data processing system is on. FIG. 5 may stop when a determination is made that the data processing system is down. FIGS. 3-5 stop running once the I/O adapter is unconfigured from the system.

FIG. 3 is a flowchart illustrating activity timer operation in accordance with an illustrative embodiment of the present invention. The process starts by setting the outstanding requests and failure counter to zero (step 302). The outstanding requests are those requests or packets sent by the I/O adapter to the device driver that have not been acknowledged by the device driver as received for processing. The number of outstanding receive requests may correspond to the number of packets that have been passed to the device driver and corresponding system to be processed without a confirmation of receipt. The failure counter may be used to keep track of the number of consecutive system health check failures.

Next, the process determines whether more receive descriptors are present to send (step 304). The receive descriptors are packets or messages that are necessarily passed to the device driver from I/O adapter for processing. Receive descriptors may be any form of communications that are sent between the I/O adapter and data processing system. For example, the receive descriptors may be command scripts to indicate the location of data sent between the Ethernet adapter and device driver. In another example, receive descriptors may be receive packets that are received by the Ethernet adapter and sent to the data processing system to be processed.

If more receive descriptors are present to send, the receive descriptors are sent to the system, the outstanding requests are incremented, and the activity timer is stopped (step 306). The outstanding requests are incremented to keep track of the receive descriptors that are sent to the system. The process then determines whether the acknowledgement timer is active (step 308). If the acknowledgement timer is active, the process returns to the determination of step 304. If the acknowledgement timer is not active in step 308, the process starts the acknowledgement timer (step 310) before returning to the determination of step 304. The acknowledgment timer is started in step 310 because a communication is sent from the I/O device to the system indicating there is a descriptor to be acknowledged by the data processing system.

Turning back to step 304, if the process determines no more receive descriptors are present to send, the process determines whether the activity timer is active (step 312). If the activity timer is not active, the process starts the activity timer (step 314) with the process terminating thereafter. The activity timer is started because a lack of receive descriptors means that there is no active communication between the I/O adapter and the system to ensure system health. The activity timer is used to keep track of how long the I/O adapter has been inactive so that system health is evaluated even if the I/O adapter is not actively communicating with the system. If the activity timer is active in step 312, the process sets the outstanding requests and failure counter to zero (step 302).

FIG. 4 is a flowchart illustrating acknowledgement timer operation in accordance with an illustrative embodiment of the present invention. FIG. 4 illustrates how the I/O adapter may restart or stop the acknowledgement timer based on the receipt or non-receipt of descriptors from the system. The I/O adapter and acknowledgement timer may be elements such as Ethernet adapter 212 and acknowledgement timer 242 of FIG. 2.

The process starts as the I/O device receives a new receive descriptor update from the system (step 402). The process then decreases the outstanding requests and sets the failure counter to zero (step 404). The process then determines whether there are any outstanding requests (step 406). If there are outstanding requests, the process restarts the acknowledgement timer (step 408). The process then determines whether more receive descriptors are received from the system (step 410). If there are no more descriptors, step 410 continues to check for more descriptors from the system. If there are more receive descriptors, the process decreases the outstanding requests and sets the failure counter to zero (step 404).

Turning back to step 406, if there are not outstanding requests in step 406, the acknowledgement timer is stopped (step 412) and then the process makes the determination of step 410. As a result of the process of FIG. 4, the I/O adapter is constantly looking for descriptors for the system and may restart the acknowledgement timer each time there is confirmation of activity between the system and I/O adapter.

FIG. 5 is a flowchart illustrating a system health status check in accordance with an illustrative embodiment of the present invention. In an illustrative embodiment of the present invention, the process of FIG. 5 is implemented in an I/O adapter such as Ethernet adapter 212 of FIG. 2. The process of FIG. 5 could also be implemented simultaneously by other I/O adapters depending on the implementation.

The process starts when the activity timer or acknowledgement timer expires (step 502). The expiration of the activity timer or acknowledgement timer indicates that there may be a system health problem or that the I/O adapter has been inactive for the time period specified by the activity timer. The process then starts a system health check (step 504).

Next, the process determines whether the system passed the health check (step 506). If the system passes the health check, the process ends. If the system does not pass the health check in step 506, the process determines whether the system has failed the health check at least three times (step 508).

In one illustrative embodiment, a failure counter may be used to keep track of how many times the system has failed. Every time that the system passes the health check, the failure counter may be set to zero. If the system has not failed the health check three times, the process increments the failure counter and starts the acknowledgment timer (step 510) with the process terminating thereafter. If the system has failed at least three times in step 508, the process starts the system recovery action (step 512) with the process terminating thereafter. The user may specify the number of times the system may fail the health status check before the specified recovery action is initiated.

Embodiments of the present invention allows a set of I/O adapters, containing one or more I/O adapters, to independently monitor the health of a system based on communications between the I/O adapter and the system and I/O adapter inactivity. As a result, system failures are more quickly detected and a system recovery action is more quickly implemented.

The circuit as described above is part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for monitoring health of a data processing system, the computer implemented method comprising:

responsive to an input/output device sending a receive descriptor to the data processing system, determining, by the input/output device, whether a response is received within a first selected period of time;

responsive to an unavailability of the receive descriptor for sending by the input/output device to the data processing system, determining, by the input/output device, whether a second selected period of time passes before the receive descriptor becomes available for sending to the data processing system, wherein the second selected period of time indicates a lack of activity between the data processing system and the input/output device, and wherein determining whether the second selected period of time passes before the receive descriptor becomes available for sending to the data processing system further comprises:

starting an activity timer for measuring the second selected period of time indicating the lack of activity between the data processing system and the input/output device;

performing, by the input/output device, a health check on the data processing system if the first selected period of time passes without receiving the response; and performing, by the input/output device, the health check on the data processing system if the second selected period of time passes without the receive descriptor becoming available to send to the data processing system.

2. The computer implemented method of claim 1, wherein determining whether the response is received within the first selected period of time further comprises:
    starting an acknowledgement timer for timing the first selected period of time.

3. The computer implemented method of claim 2, further comprising:
    responsive to the input/output device receiving the receive descriptor from the data processing system, resetting the acknowledgement timer.

4. The computer implemented method of claim 1, further comprising;
    responsive to the data processing system failing the health check a set number of times starting a system recovery action.

5. The computer implemented method of claim 4, wherein the first selected period, the second selected period, and the set number of times is set by a user and determined by the data processing system.

6. The computer implemented method of claim 4, wherein the set number of times is three.

7. The computer implemented method of claim 4, wherein the system recovery action is any of rebooting the data processing system, activating a stand-by-system, and entering a limited operation mode.

8. The computer implemented method of claim 1, further comprising:
    responsive to the data processing system failing the health check less than the set number of times, incrementing a failure counter for recording the number of times the data processing system has failed the health check and restarting the acknowledgement timer.

9. The computer implemented method of claim 8, further comprising:
    responsive to the data processing system passing the health check, resetting the failure counter to zero.

10. The computer implemented method of claim 1, wherein the input/output device is an Ethernet adapter.

11. The computer implemented method of claim 1, wherein the health check determines if the data processing system has failed.

12. The computer implemented method of claim 1, wherein a plurality of input/output devices perform the steps of method 1.

13. The computer implemented method of claim 1, further comprising:
    responsive to the receive descriptor becoming available for sending to the data processing system, resetting the activity timer.

14. The computer implemented method of claim 1, wherein the response and the receive descriptor is a communication between the input/output device and the data processing system.

15. A system comprising:
    a processor for processing an operating system and a device driver of the operating system;
    a storage device operably connected to the processor for storing the operating system, wherein the operating system may be loaded into a main memory for execution by the processor; and
    an input/output device operably connected to the processor, wherein a controller of the input/output device starts an acknowledgement timer for determining whether a response is received within a first selected period of time in response to the input/output device sending a receive descriptor to the device driver, starts an activity timer measuring a lack of activity between the device driver and the input/output device for determining whether a second selected period of time passes before the receive descriptor becomes available in response to an unavailability of a receive descriptor to send to the device driver, performs a health check of the system if the first selected period of time passes without receiving the response, performs a health check of the system if the second selected period of time passes without the receive descriptor becoming available to send to the device driver, and starts a system recovery action in response to the system failing the health check.

16. The system of claim 15, wherein the input/output device is an Ethernet adapter.

17. The system of claim 15, wherein responsive to the receive descriptor becoming available for sending to the device driver, resetting the activity timer.

18. A computer program product comprising a computer usable medium including computer usable program code for monitoring health of a data processing system, the computer program product comprising:
    computer usable program code, responsive to an input/output device sending a receive descriptor to the data processing system, for determining whether a response is received within a first selected period of time;
    computer usable program code, responsive to an unavailability of the receive descriptor for sending by the input/output device to the data processing system, for determining whether a second selected period of time passes before the receive descriptor becomes available for sending to the data processing system, wherein the second selected period of time indicates a lack of activity between the data processing system and the input/output device, and wherein the computer usable program code for determining whether the second selected period of time passes before the receive descriptor becomes available for sending to the data processing system further comprises:
        computer usable program code for starting an activity timer for measuring the second selected period of time indicating the lack of activity between the data processing system and the input/output device;
    computer usable program code for performing a health check on the data processing system if the first selected period of time passes without receiving the response; and
    computer usable program code for performing the health check on the data processing system if the second selected period of time passes without the receive descriptor becoming available to send to the data processing system.

19. The computer program product of claim 18, further comprising:
    computer usable program code, responsive to the receive descriptor becoming available for sending to the data processing system, for resetting the activity timer.

* * * * *